(12) United States Patent
Lewis

(10) Patent No.: US 6,389,587 B1
(45) Date of Patent: May 14, 2002

(54) USER INTERFACE FOR DEVELOPING AND EXECUTING DATA FLOW PROGRAMS AND METHODS, APPARATUS, AND ARTICLES OF MANUFACTURE FOR OPTIMIZING THE EXECUTION OF DATA FLOW PROGRAMS

(75) Inventor: Bradley Lewis, Broomfield, CO (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/244,136

(22) Filed: Feb. 4, 1999

(51) Int. Cl.[7] .................................................. G06F 9/44
(52) U.S. Cl. ..................... 717/1; 717/4; 717/9; 709/101
(58) Field of Search ............................... 717/1, 4, 2, 3, 717/9; 345/348; 709/101; 707/503; 716/3

(56) References Cited

U.S. PATENT DOCUMENTS

| | | | | |
|---|---|---|---|---|
| 4,860,204 A | * | 8/1989 | Gendron et al. ................. | 717/2 |
| 5,005,119 A | * | 4/1991 | Rumbaugh et al. ......... | 709/101 |
| 5,136,705 A | * | 8/1992 | Stubbs et al. .................. | 714/27 |
| 5,251,122 A | * | 10/1993 | Sakamoto et al. .......... | 364/147 |
| 5,291,587 A | * | 3/1994 | Kodosky et al. ............. | 395/500 |
| 5,301,336 A | * | 4/1994 | Kodosky et al. ............. | 345/348 |
| 5,481,741 A | * | 1/1996 | McKaskle et al. ........... | 395/800 |
| 5,650,948 A | | 7/1997 | Gafter ........................... | 716/3 |
| 5,732,277 A | * | 3/1998 | Kodosky et al. ................ | 717/4 |
| 5,801,708 A | * | 9/1998 | Alcorn et al. ................. | 345/430 |
| 5,950,182 A | * | 9/1999 | Godbole et al. ............... | 706/45 |
| 6,138,270 A | * | 10/2000 | Hsu ................................ | 717/3 |
| 6,189,141 B1 | * | 2/2001 | Benitez et al. ................. | 717/4 |
| 6,219,628 B1 | * | 4/2001 | Kodosky et al. ............... | 703/2 |
| 6,226,789 B1 | * | 5/2001 | Tye et al. ....................... | 717/7 |
| 6,243,858 B1 | * | 6/2001 | Mizoguchi et al. ............ | 717/1 |
| 6,286,017 B1 | * | 9/2001 | Egilson ....................... | 707/503 |
| 6,141,725 A1 | * | 10/2001 | Tucker et al. ............... | 711/100 |

* cited by examiner

Primary Examiner—Tuan Q. Dam
Assistant Examiner—Chameli C. Das
(74) Attorney, Agent, or Firm—Thelen Reid & Priest LLP; David B. Ritchie

(57) ABSTRACT

Methods, systems, and articles of manufacture consistent with the present invention provides a development tool that enables computer programmers to design and develop a data flow program for execution in a multiprocessor computer system. The tool displays an interface that enables the programmer to define a region divided into multiple blocks, wherein each block is formed of a set of values associated with a function, and to define sets of the blocks, each block in a set having a state reflected by a designated portion of the program that when executed transforms the values forming the block based on the function. The interface also records any dependencies among the blocks, each dependency indicating a relationship between two blocks and requiring the portion of the program associated with a first block of the relationship to be executed before the portion of the program associated with a second block of the relationship. After program development, blocks are selected for execution of the corresponding, designated portions of the program based on the recorded dependencies.

42 Claims, 15 Drawing Sheets

USER INTERFACE FOR DEVELOPING AND EXECUTING DATA FLOW PROGRAMS AND METHODS, APPARATUS, AND ARTICLES OF MANUFACTURE FOR OPTIMIZING THE EXECUTION OF DATA FLOW PROGRAMS

RELATED APPLICATION

This application is related to U.S. application Ser. No. 09/244,138, entitled "Method, Apparatus and Article of Manufacture for Developing and Executing Data Flow Programs," which is incorporated in its entirety herein by reference.

BACKGROUND OF THE INVENTION

A. Field of the Invention

This invention relates to the field of multiprocessor computer systems and, more particularly, to data driven processing of computer programs using a multiprocessor computer system.

B. Description of the Related Art

Multiprocessor computer systems include two or more processors that may be employed to execute the various instructions of a computer program. A particular set of instructions may be performed by one processor while other processors perform unrelated sets of instructions.

Fast computer systems, like multiprocessor computer systems, have stimulated the rapid growth of a new way of performing scientific research. The broad classical branches of theoretical science and experimental science have been joined by computational science. Computational scientists simulate on supercomputers phenomena too complex to be reliably predicted by theory and too dangerous or expensive to be reproduced in a laboratory. Successes in computational science have caused demand for supercomputing resources to rise sharply in recent years.

During this time, multiprocessor computer systems, also referred to as "parallel computers," have evolved from experimental contraptions in laboratories to become the everyday tools of computational scientists who need the ultimate in computing resources in order to solve their problems. Several factors have stimulated this evolution. It is not only that the speed of light and the effectiveness of heat dissipation impose physical limits on the speed of a single processor. It is also that the cost of advanced single-processor computers increases more rapidly than their power. And price/performance ratios become more favorable if the required computational power can be found from existing resources instead of purchased. This factor has caused many sites to use existing workstation networks, originally purchased to do modest computational chores, as "SCAN"s (SuperComputers At Night) by utilizing the workstation network as a parallel computer. This scheme has proven so successful, and the cost effectiveness of individual workstations has increased so rapidly, that networks of workstations have been purchased to be dedicated to parallel jobs that used to run on more expensive supercomputers. Thus, considerations of both peak performance and price/performance are pushing large-scale computing in the direction of parallelism. Despite these advances, parallel computing has not yet achieved wide-spread adoption.

The biggest obstacle to the adoption of parallel computing and its benefits in economy and power is the problem of inadequate software. The developer of a program implementing a parallel algorithm for an important computational science problem may find the current software environment to be more of an obstruction than smoothing the path to use of the very capable, cost-effective hardware available. This is because computer programmers generally follow a "control flow" model when developing programs, including programs for execution by multiprocessor computers systems. According to this model, the computer executes a program's instructions sequentially (i.e., in a series from the first instruction to the last instruction) as controlled by a program counter. Although this approach tends to simplify the program development process, it is inherently slow.

For example, when the program counter reaches a particular instruction in a program that requires the result of another instruction or set of instructions, the particular instruction is said to be "dependent" on the result and the processor cannot execute that instruction until the result is available. Moreover, executing programs developed under the control flow model on multiprocessing computer systems results in a significant waste of resources because of these dependencies. For example, a first processor executing one set of instructions in the control flow program may have to wait for some time until a second processor completes execution of another set of instructions, the result of which is required by the first processor to perform its set of instructions. This wait-time translates into an unacceptable waste of computing resources in that at least one of the processors in this two-processor configuration is idle the whole time while the program is running.

To better exploit parallelism in a program some scientists have suggested use of a "data flow" model in place of the control flow model. The basic concept of the data flow model is to enable the execution of an instruction whenever its required operands become available, and thus, no program counters are needed in data-driven computations. Instruction initiation depends on data availability, independent of the physical location of an instruction in the program. In other words, instructions in a program are not ordered. The execution simply follows the data dependency constraints.

Programs for data-driven computations can be represented by data flow graphs. An example data flow graph is illustrated in FIG. 1 for the calculation of the following expression:

$$z=(x+y)*2$$

When, for example, x is 5 and y is 3, the result z is 16. As shown graphical in the figure, z is dependent on the result of the sum and x and y. The data flow graph is a directed acyclic graph ("DAG") whose nodes correspond to operators and arcs are pointers for forwarding data. The graph demonstrates sequencing constraints (i e., constraints with data dependencies) among instructions.

For example, in a conventional computer, program analysis is often done (i) when a program is compiled to yield better resource utilization and code optimization, and (ii) at run time to reveal concurrent arithmetic logic activities for higher system throughput. For instance, consider the following sequence of instructions:

1. P=X+Y
2. Q=P/Y
3. R=X*P
4. S=R−Q
5. T=R*P
6. U=S/T

The following five computational sequences of these instructions are permissible to guarantee the integrity of the result when executing the instructions on a serial computing system (e.g., a uniprocessor system):

1, 2, 3, 4, 5, 6
1, 3, 2, 5, 4, 6
1, 3, 5, 2, 4, 6
1, 2, 3, 5, 4, 6
1, 3, 2, 4, 5, 6

For example, the first instruction must be executed first, but the second or third instruction can be executed second, because the result of the first instruction is required for either the second or third instruction, but neither the second nor the third requires the result of the other. The remainder of each sequence follows this simple rule-no instruction can be run until its operands (or inputs) are available.

In a multiprocessor computer system with two processors, however, it is possible to perform the six operations in four steps (instead of six) with the first processor computing step 1, followed by both processors simultaneously computing steps 2 and 3, followed by both processors simultaneously computing steps 4 and 5, and finally either processor computing step 6. This is an obvious improvement over the uniprocessor approach because execution time is reduced.

Using data flow as a method of parallelization will thus extract the maximum amount of parallelism from a system. Most source code, however, is in a control form, which is difficult and clumsy to parallelize efficiently for all types of problems.

It is therefore desirable to provide a facility for developers to more easily develop data flow programs and to convert existing control flow programs into data flow programs for execution on multiprocessor computer systems. There is also a need for technique that optimizes performance of the data flow programs in a multiprocessor computer system.

SUMMARY OF THE INVENTION

Methods, systems, and articles of manufacture consistent with the present invention overcome the shortcomings of existing systems by enabling developers to easily convert control flow programs into a data flow approach and to develop new programs according to the data flow model. According to one aspect of the present invention, such methods, systems, and articles of manufacture, as embodied and broadly described herein, this program development process includes defining a memory region and dividing it into multiple blocks, each block defining a set of values associated with a function. Sets of the blocks are defined, each block in a set having a state reflected by a designated portion of the program that when executed transforms the values forming the block based on the function. Additionally, any dependencies among the blocks are specified by the user. Each dependency indicates a relationship between two blocks and requires the portion of the program associated with one of the two blocks to be executed before the portion of the program associated with the other block.

In accordance with another aspect of the present invention, methods, systems, and articles of manufacture, as embodied and broadly described herein, execute a data flow program in a multiprocessor computer system. Execution of the program involves selecting information in a queue identifying a block formed of a set of values associated with a function of the program and determining whether execution of a portion of the program associated with the selected block is dependent on a result of the execution of a portion of the program associated with another block. The portion of the program associated with the selected block is then executed when it is determined that execution of the portion of the program associated with the selected block is not dependent on a result of the execution of a portion of the program associated with the other block. This selection and determination is repeated when it is determined that execution of the portion of the program associated with the selected block is dependent on a result of the execution of a portion of the program associated with the other block.

In accordance with yet another aspect of the present invention, methods, systems, and articles of manufacture are provided that optimize execution of data flow programs in a multiprocessor computer system. A data flow program consists of memory region information, including block information and dependency information. The block information reflects multiple blocks that define a memory region. Each block is formed of a set of values associated with a function and has a state reflected by a designated portion of the program that when executed transforms the values forming the block based on the function. The dependency information reflects any dependencies among the blocks, each dependency indicating a relationship between two blocks and requiring the portion of the program associated with a first block of the relationship to be executed before the portion of the program associated with a second block of the relationship. A queue is formed organizing the memory region information in such a way as to optimize execution of data flow program.

In accordance with one aspect of the invention, as broadly described herein, the queue is formed by generating a directed acyclic graph based on the memory region information with each block having a corresponding node in the graph, traversing the directed acyclic graph according to a predetermined function, and placing information identifying each block in the queue based on the traversal of the directed acyclic graph. In accordance with another aspect of the invention, as broadly described herein, the queue may be divided into part, or multiple queues may be employed. In this case, each part of the queue or individual queue has a priority, and (i) the blocks are assigned to the parts or queues based on a priority associated with each block and (ii) selected from the parts or queues for execution in accordance with the queue assignment.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION

Figure 1:
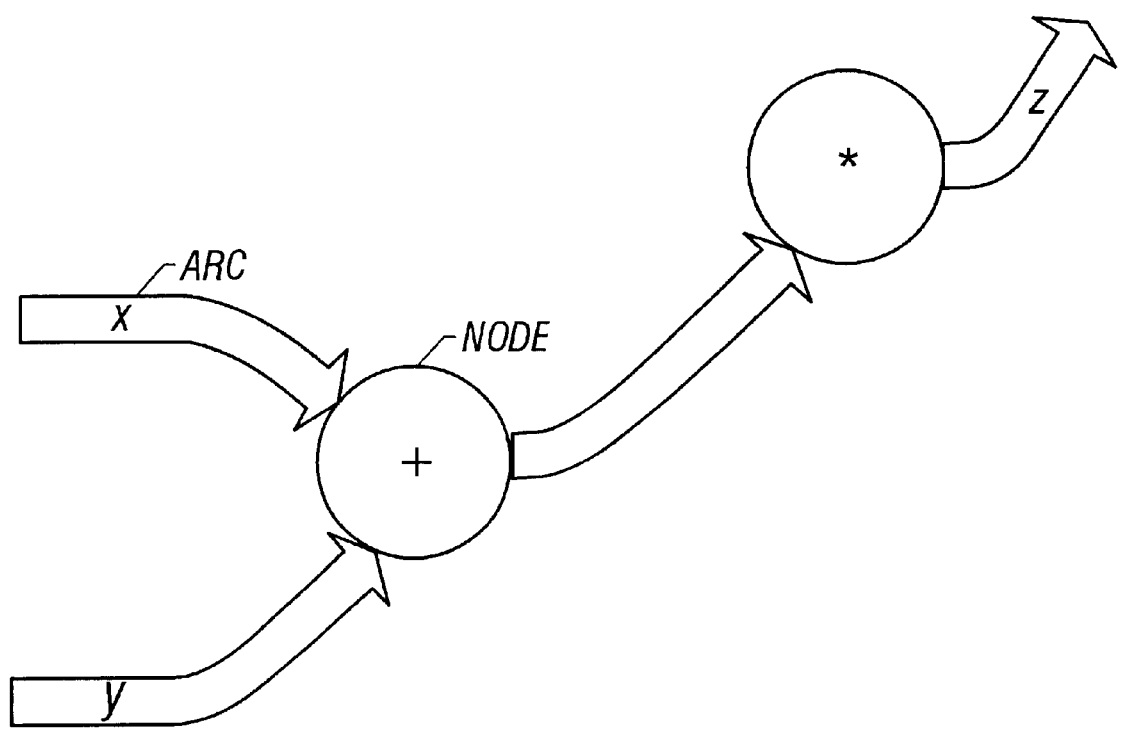
FIG. 1 depicts an example data flow graph for the calculation of a particular expression.

Reference will now be made in detail to an implementation consistent with the present invention as illustrated in the accompanying drawings. Wherever possible, the same reference numbers will be used throughout the drawings and the following description to refer to the same or like parts.

Introduction

Methods, systems, and articles of manufacture consistent with the present invention enable developers to convert control flow programs into data flow programs and to develop new programs according to the data flow model. Such methods, systems, and articles of manufacture may utilize a development tool, including a computer-human interface, to design and develop the data flow programs.

Data flow programs developed in accordance with the principles of the present invention are executed on a multiprocessor computer system using a data flow model. The interface may be operated on a different data processing system from that used for program execution. Alternatively, the interface may be operated on the same system used for program execution.

One characteristic of the data flow model in accordance with the present invention is that operations can be performed in parallel on blocks of a memory region. A block consists of a set of data, such as an array or matrix of values or other information. Together, multiple blocks form a memory region.

The data flow program development tool provides an interface that enables a developer to define a memory region containing data associated with a system. In this context, the term "system" refers to a physical, mathematical, or computational problem, such as the structural analysis of a building, the flow of fluid through a pipe, etc. Typically, such complex systems require a great deal of processing to solve many equations and the result of one set of equations is dependent on the result of another set of equations. For example, fluid flowing though a pipe is slowed by friction from the interior of the pipe. The friction directly affects the speed of the fluid touching the interior of the pipe (defined by a first set of equations) and indirectly affects other fluid in the pipe not touching the interior (defined perhaps by the same equations but dependent on the result of the first set of equations). Thus, the effects of friction caused by the interior of the pipe are different for fluid flowing in the pipe depending on where in the fluid is in the pipe at any given instance.

After defining the region, the developer then divides the region into blocks, and for each block, the developer specifies the program code to be executed on the values within the block as well as any dependency between the block and other blocks in the region. Blocks with the same program code are said to share the same "state." They can generally be executed in parallel because they do not depend on one another for results. In the fluid flow example, blocks associated with fluid flowing next to the interior of the pipe would share the same state (and therefore have the same program code for execution) but this state (and code) would be different from the state (and code) of fluid that is not touching the interior but is next to the fluid that is. Moving inwardly into the pipe and the state (and code) of each block associated with fluid in the pipe changes to reflect the dependencies in a similar manner.

Dependencies are reflected in links between each of the dependent blocks and the blocks from which they depend. A block is dependent on another block when the first block requires the result of the second block for the first block to perform properly within the system. These relationships may be viewed graphically through a directed acyclic graph ("DAG"). Associated with each node in the graph are program code and data determined by the block.

The blocks are then queued for processing in a multiprocessor computer system. Actually, the blocks themselves are not put in the queue. Rather, information identifying each block such as a pointer is placed in the queue. The blocks are queued or organized in the queue in a particular manner and the thread(s) executing the data flow program can select the appropriate block for execution of its corresponding program code at any given point in time during the data flow program execution. In one implementation, the blocks are queued according to the dependency information associated with each block.

This block queuing process for performance optimization of the program follows the organization of the DAG. In other words, the DAG may be logically traversed using a number of different methods to select the best organization for the queue prior to program execution. Moreover, the organization of the queue may be modified during program execution to address factors affecting performance of the program not readily determinable before program execution.

One approach to organizing the blocks involves traversing the DAG associated with a memory region of blocks while applying a particular function, such as a weighting function that assigns weights to each node or a sort algorithm applicable to DAGs. To optimize performance of the data flow program, however, multiple queues may be employed with each queue having a priority defining the order in which blocks are dequeued. In other words, blocks in a higher priority queue are selected for execution before blocks in another queue based on the priorities associated with the queues.

The developer may designate the number of threads available to process the blocks. Each thread maintains a program counter and temporary memory, as needed, to perform the program code associated with the blocks. For example, the developer may designate one thread per processor. Alternative configurations are also possible in accordance with the principles of the present invention.

Each thread, in turn, selects a block from the queue and executes the program code designated by the developer for that block. As long as there are blocks in the queue, the threads, when available, select them and execute their program code. Additionally, queued blocks are selected for execution in a manner that reflects each block's dependency information. When an available thread selects a queued block for execution, the thread first examines the block's dependency information (i.e., any links to other blocks) and if the blocks from which the selected block depends have completed execution, then the thread can proceed to execute the program code for the selected block. Otherwise, the thread may enter a wait state until it can begin executing the program code for the selected block. Alternatively, the thread may select the next available block in the queue, based on any priority if appropriate, and examine that block to determine its status with respect to any blocks upon which it depends (i e., have all blocks from which it depends completed execution so that the program code of the selected block can be executed safely). This process continues until the threads have completed executing the program code associated with all blocks in the queue.

The following description includes details on the design and development of data flow programs followed by aspects of the execution phase.

Defining a Data Flow Program Using Regions and Blocks

Figure 2:
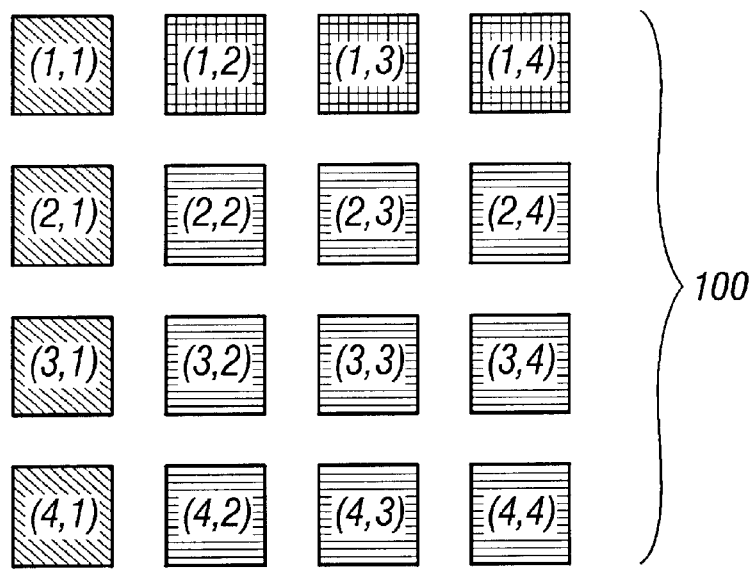
FIG. 2 depicts a block diagram illustrating an example of a memory region defined in a manner consistent with the present invention.
Figure 2:
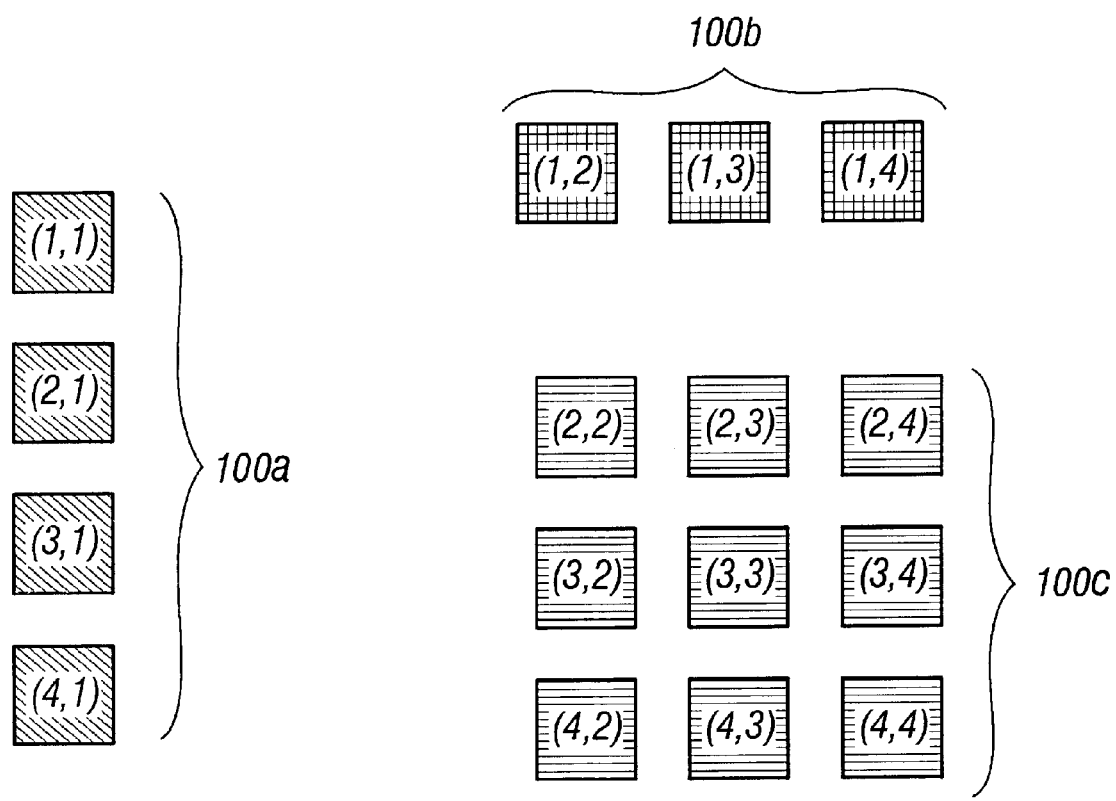

At the beginning of the design and development process, a developer specifies a memory region and divides the region into blocks. This may be done graphically using an interface provided with the development tool. FIG. 2 shows an example of a memory region 100 that contains sixteen blocks arranged in a four-by-four matrix, with each block identified by a row number and column number. For example, the block in the upper left corner of memory region 100 is labeled (1,1) indicating that it is located in the first row and the first column, and the block in the lower right hand corner of region 100 is labeled (4,4) indicating that it is located in the lower right corner. All of the remaining fourteen blocks follow the same labeling convention. As explained, each block contains a data set, such as a matrix or array of values or information, to be processed in accordance with certain program code.

After defining the memory region and dividing it into blocks, the developer specifies a state of each block. As explained, the state of a block corresponds to the program code that the developer assigns to that block, meaning that the developer intends to have the multiprocessor computer system operate on the data in the block using the specified program code. The interface provides the developer with a window or other facility to provide the program code for a block. The development tool associates the code with its block.

In the example region 100, the group of blocks 100a labeled (1,1), (2,1), (3,1), and (4,1) share the same state, the group of blocks 100b labeled (1,2), (1,3), and (1,4) share the same state, and the group of blocks 100c labeled (2,2), (2,3), (2,4), (3,2), (3,3), (3,4), (4,2), (4,3), and (4,4) share the same state. The three different states are shown in FIG. 2 by different shading (or fill) for the blocks in each group.

Although the region 100 and its blocks are shown as being uniform in size, in practice a memory region and blocks may have different shapes and sizes. For example, memory region 100 consists of sixteen blocks in a four-by-four matrix and, although not specified in the figure, each block may have an eight-by-eight matrix. Alternatively, and depending on the application, the memory region may consist of a four-by-three matrix of blocks and each block may consist of a three-by-two matrix of data.

Figure 3A:
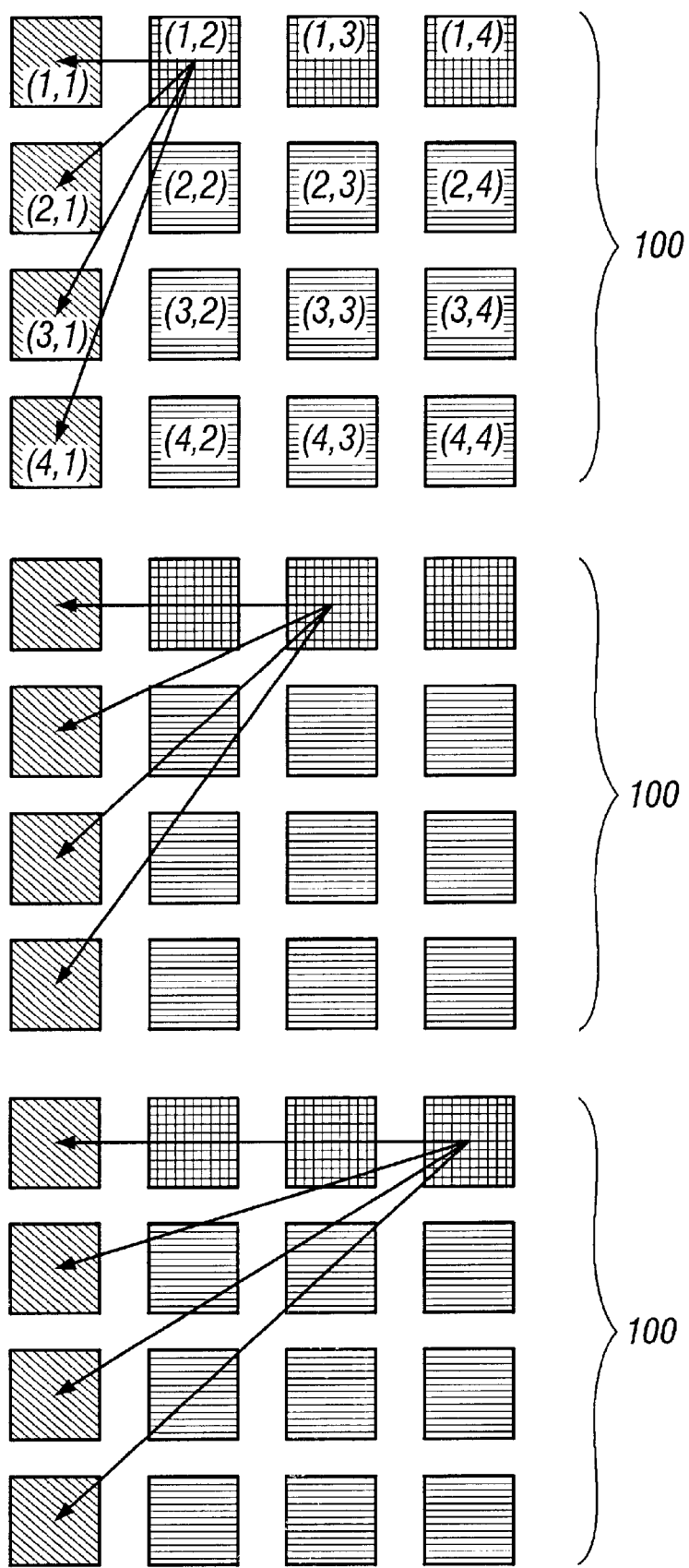
FIGS. 3A and 3B depict block diagrams illustrating an example of dependency relationships among the blocks of the memory region illustrated in FIG. 2.
Figure 3B:
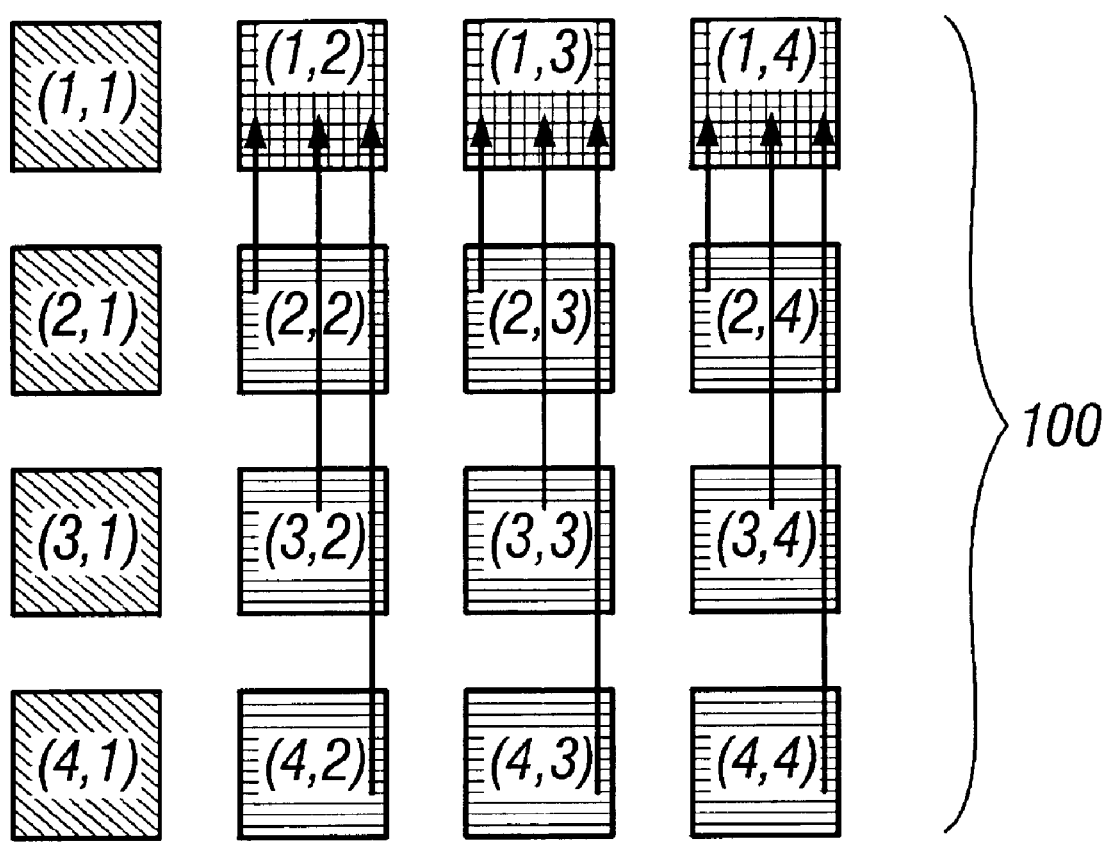

Next, the developer specifies any dependency relationships among the blocks. Again, a dependency relationship is defined as a relationship in which one block is dependent upon the result or final state of another block during program execution. In other words, one block has to be processed before the second, dependent block can be processed. FIGS. 3A and 3B illustrate a number of examples of dependency relationships using region 100 of FIG. 2. As shown in FIG. 3A, each of the blocks labeled (1,2), (1,3), and (1,4) are dependent on the blocks labeled (1,1), (2,1), (3,1), and (4,1). This means that all of the blocks labeled (1,1), (2,1), (3,1), and (4,1) must be processed before any of the blocks (1,2), (1,3), and (1,4).

Similarly, FIG. 3B illustrates dependencies among each of the blocks labeled (1,2), (1,3), and (1,4) and the blocks labeled (2,2), (2,3), (2,4), (3,2), (3,3), (3,4), (4,2), (4,3), and (4,4). As shown, the block labeled (1,2) must be processed before the blocks in the same column labeled (2,2), (2,3), (2,4); the block labeled (1,3) must be processed before the blocks in the same column labeled (3,2), (3,3), (3,4); and the block labeled (1,4) must be processed before the blocks in the same column labeled (4,2), (4,3), and (4,4). The figures simply illustrate one example of a dependency configuration for memory region 100; other configurations may be selected by the developer.

Figure 4:
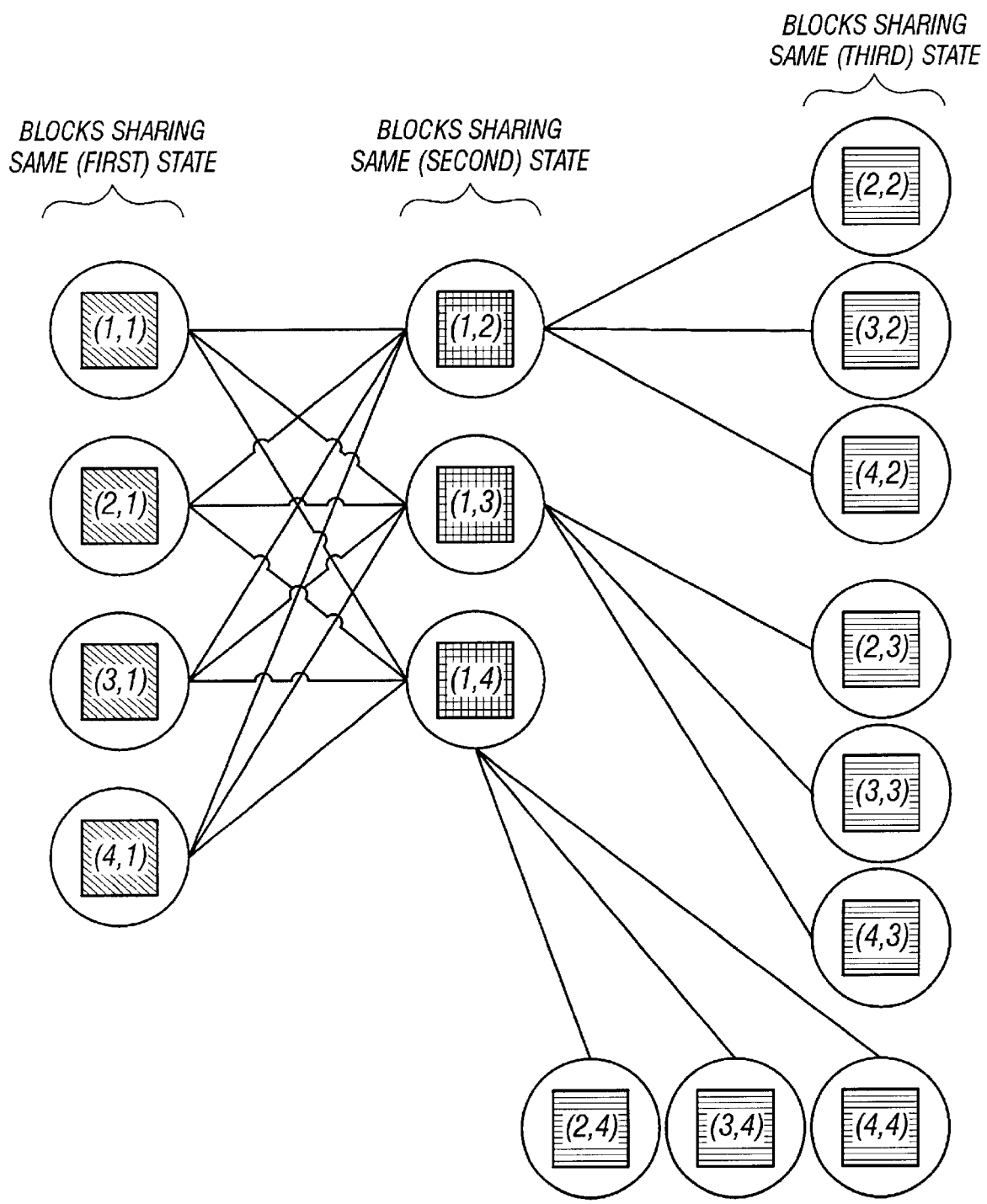
FIG. 4 depicts an example of a directed acyclic graph illustrating the dependency relationships corresponding to FIGS. 3A and 3B.

To complete the view of dependency relationships, it is useful to see them graphically which can also be done using the user interface. FIG. 4 is a DAG illustrating the dependency relationships shown in FIGS. 3a and 3b. The DAG of FIG. 4 illustrates graphically that the output of all of the blocks sharing the first state are required for processing by each of the blocks sharing the second state. In turn, each of the blocks sharing the second state must be processed before each of the three groups of three blocks that share the third state are processed. Such a graph may be used to order the blocks for processing in accordance with the principles of the present invention (discussed below).

Data Flow Program Development Tool

Computer Architecture

Figure 5:
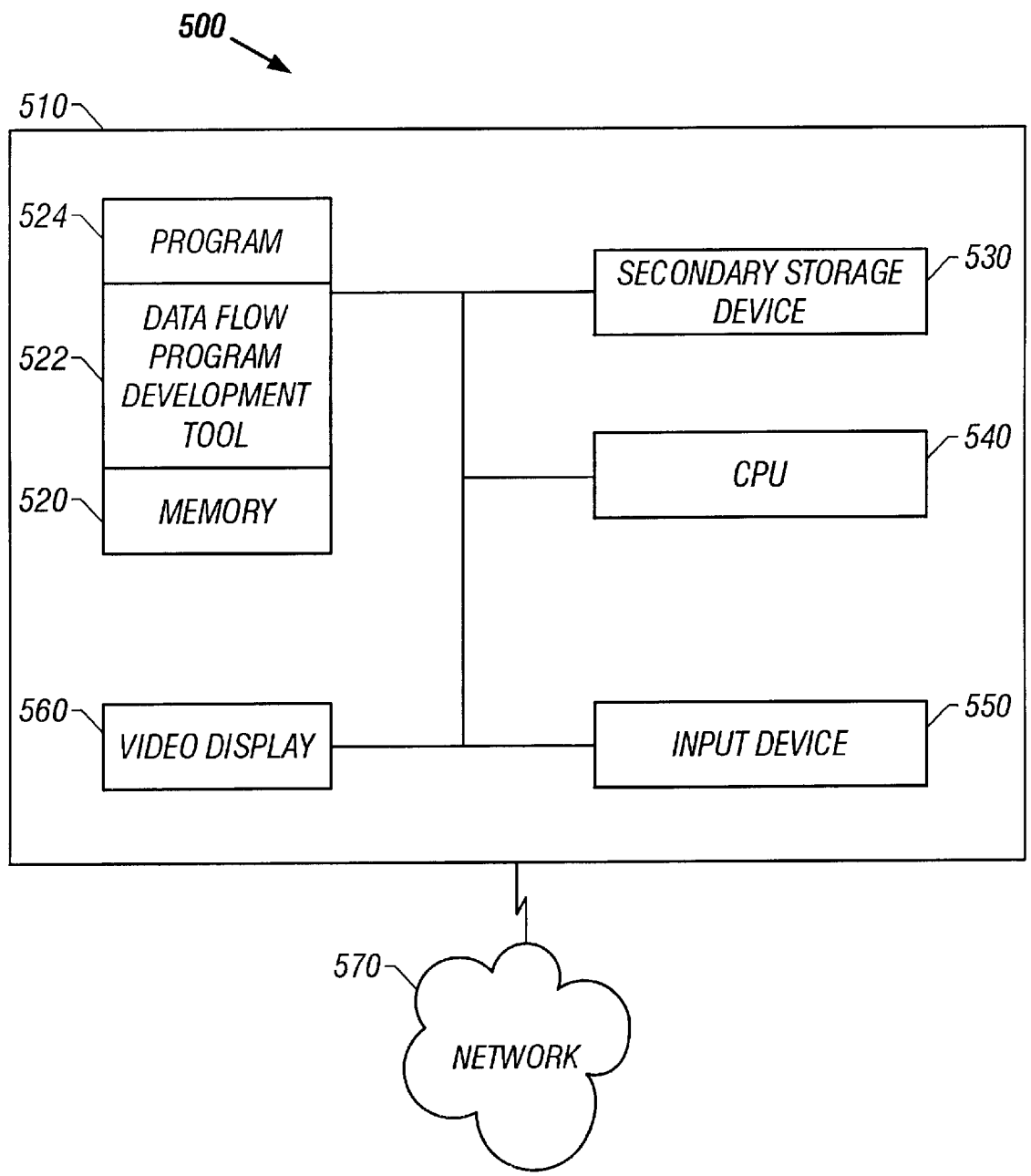
FIG. 5 depicts a block diagram of an exemplary data processing system with which the invention may be implemented.

FIG. 5 depicts an exemplary data processing system 500 suitable for practicing methods and implementing systems consistent with the present invention. Data processing system 500 includes a computer system 510 connected to a network 570, such as a Local Area Network, Wide Area Network, or the Internet.

Computer system 510 contains a main memory 520, a secondary storage device 530, a central processing unit (CPU) 540, an input device 550, and a video display 560. Main memory 520 contains a data flow program development tool 522 and program 524. Data flow program development tool 522 provides the interface for designing and developing data flow programs, including programs that utilize control flow program code. Using display 560 the tool enables developers to design memory regions, such as region 100 of FIG. 2, and divide the regions into blocks with corresponding states. The tool further enables developers to write program code to operate on each of the blocks using a multiprocessor computer system (see FIG. 7).

Program 524 represents a data flow program designed in accordance with the present invention, for example, using tool 522. Program 524 consists of the information specifying a memory region, the blocks of the region, the program code associated with each block, and any dependency relationships between the blocks.

Although aspects of one implementation are depicted as being stored in memory 520, one skilled in the art will appreciate that all or part of systems and methods consistent with the present invention may be stored on or read from other computer-readable media, such as secondary storage devices, like hard disks, floppy disks, and CD-ROM; a carrier wave received from a network such as the Internet; or other forms of ROM or RAM. Finally, although specific components of data processing system 500 have been described, one skilled in the art will appreciate that a data processing system suitable for use with methods and systems consistent with the present invention may contain additional or different components.

Process

Figure 6:
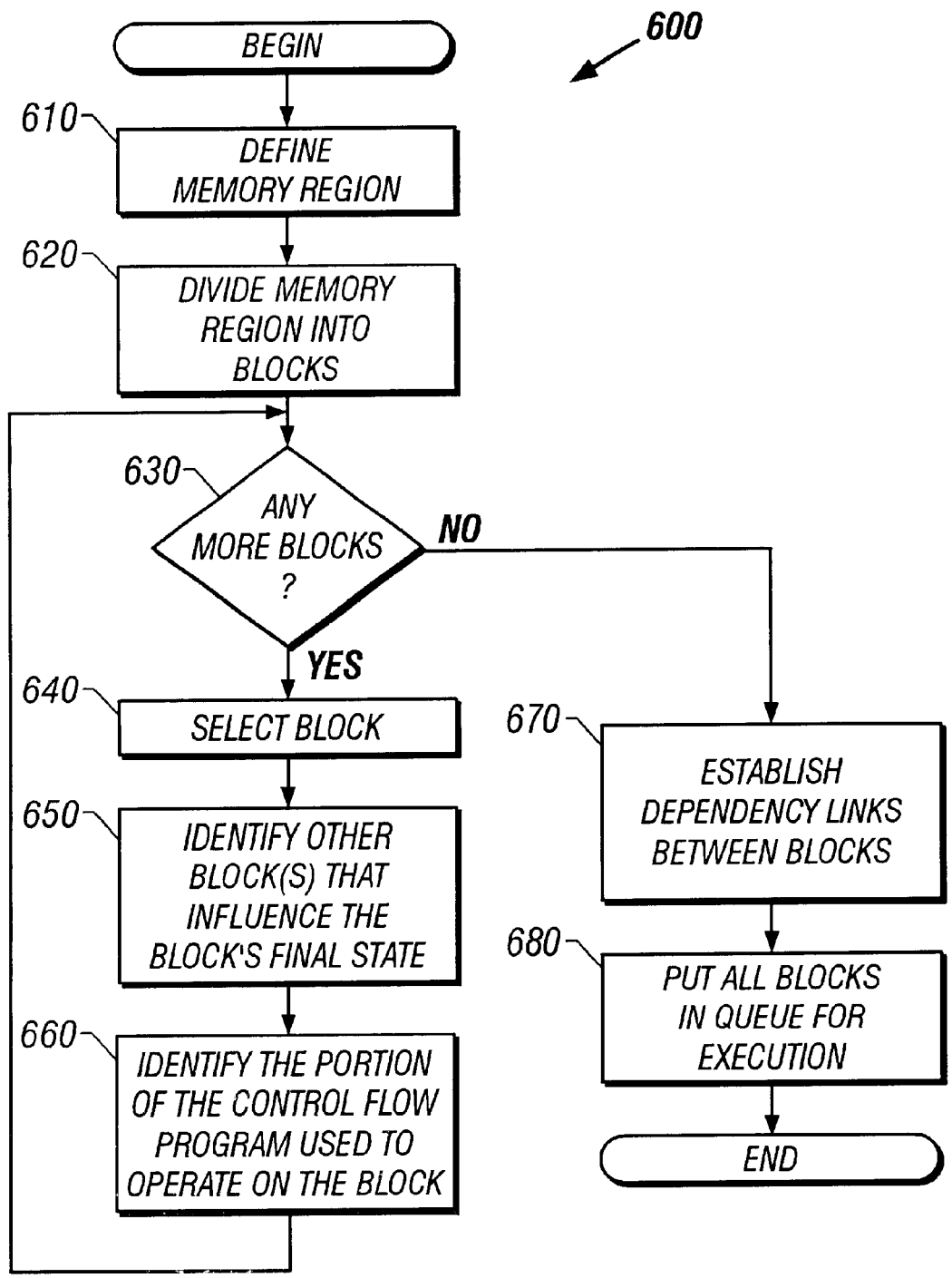
FIG. 6 depicts a flow chart of the operations performed by a data flow program development tool consistent with the present invention.

FIG. 6 is a flow chart of the process 600 performed by developers to write programs using the data flow model. This process may be performed by tool 522 in a manner consistent with the principles of the present invention. As explained, tool 522 provides an environment, including a user interface and related functionality, for software developers to write programs using the data flow model.

After a developer initiates execution of tool 522, it displays the various views necessary for the developer to write a data flow program. First, the tool displays a view with which the developer defines a memory region (step 610). Using tool 522, the developer then divides the region into blocks (step 620).

As long as there are blocks in a region to be processed (step 630), the developer selects a block (step 640), identifies any other block(s) that influence the selected block's final state (in other words, block(s) upon which the selected block is dependent) (step 650), and specifies the program code for each block, for example, a portion of an existing control flow program (step 660). Although this description involves converting an existing control flow program for operation in a multiprocessor computer system using a data flow organization, those skilled in the art will recognize that the tool 522 may also be used to develop new data flow programs for execution on a multiprocessor computer system.

After all of the blocks have been processed (steps 640 to 660), the developer establishes the dependency relationships among the blocks by graphically linking them together (step 670). The tool 522 uses the graphical information to generate and store data reflecting the links. The blocks are then logically queued for processing in a multiprocessor computer system (step 680). The tool 522 uses the dependency/link information to queue the blocks in manner that reflects an appropriate order for processing. For example, any block (s) upon which a particular block is dependent may be placed in the queue before that particular block. For the example of FIGS. 2–4, the blocks may be queued in the manner shown in FIG. 7 with the blocks sharing the first state, i.e., (1,1), (2,1), (3,1), and (4,1), queued before the blocks with the second state, i.e., (1,2), (1,3), and (1,4), and followed by the blocks sharing the third state, i. e., (2,2), (2,3), (2,4), (3,2), (3,3), (3,4), (4,2), (4,3), and (4,4).

Multiprocessor Program Execution

Figure 8:
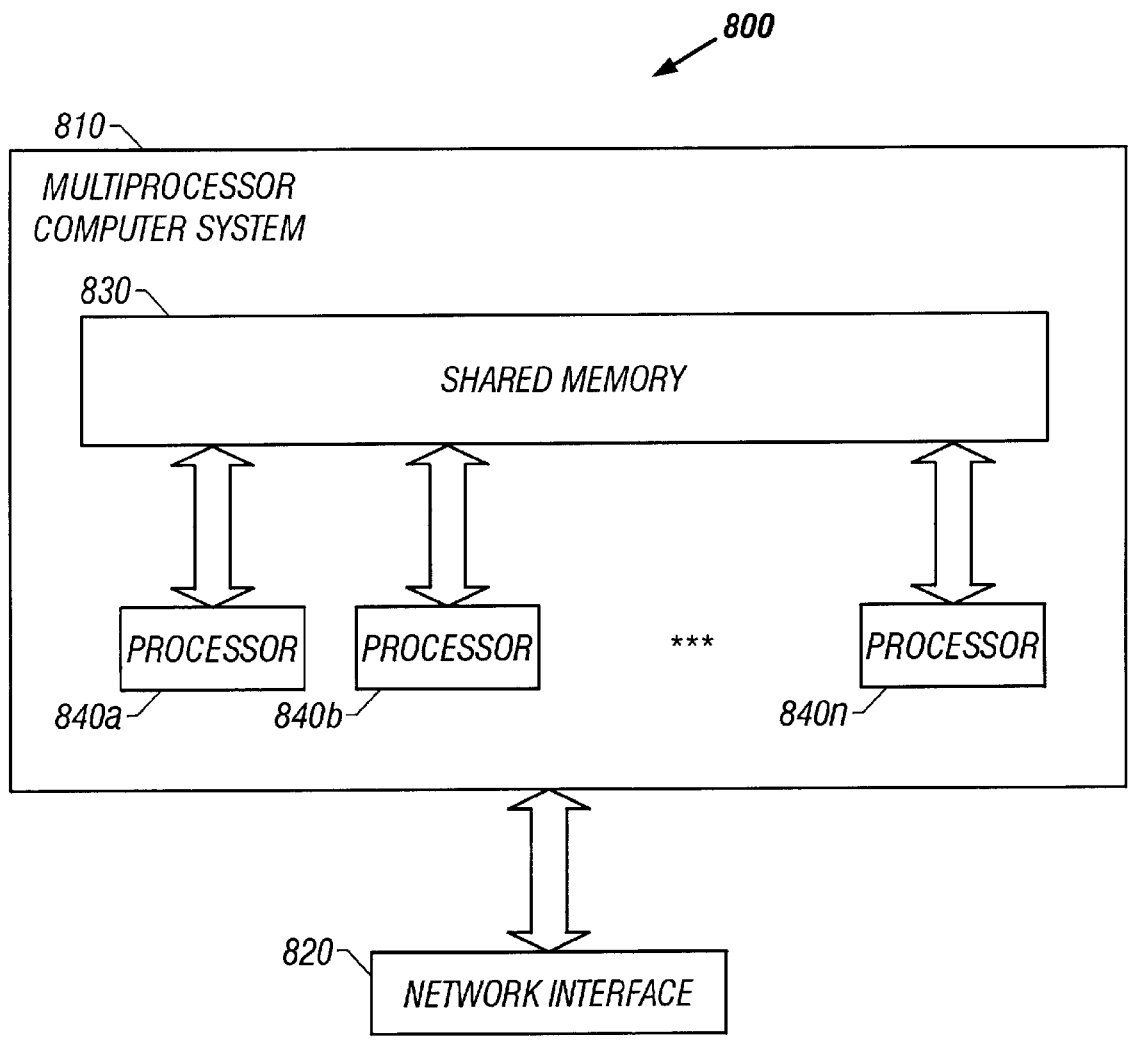
FIG. 8 depicts a block diagram of an exemplary multi-processor computer system suitable for use with methods and systems consistent with the present.

As explained, in accordance with the present invention a data flow program is executed in a multiprocessor computer system. There are many configurations for such a multiprocessor computer system, one of which is illustrated in FIG. 8. For example, in a tightly coupled configuration, the multiple processors of a system may all be located in the same physical box. In an alternative, loosely coupled arrangement the system may be formed by multiple computers in a network, each computer having a separate processor.

Multiprocessor Computer System

As shown in FIG. 8, a multiprocessor computer system 810 is connected to a network interface 820, which enables a developer to transfer the data flow program from the development tool environment (e.g., FIG. 5) for execution in multiprocessor computer system 810. Alternatively, the data flow program development process in accordance with the principles of the present invention may be performed on system 810, which is also used for program execution. This alternative approach eliminates the need to transfer the program from a system used for development to a separate system used for program execution.

Multiprocessor computer system 810 comprises a single, shared memory 830 and multiple processors 840*a*, 840*b*, . . . 840*n*. The number and type of processors is not critical to execution of the data flow program developed in accordance with the present invention. For example, an HPC Server with a multiple processor configuration may be used. The HPC Server is a product of Sun Microsystems, Inc. Processes execute independently on each of the processors and share memory 830. A process in this context may be a thread controlling execution of program code associated with a block of a data flow program developed using tool 522.

Process

Figure 9:
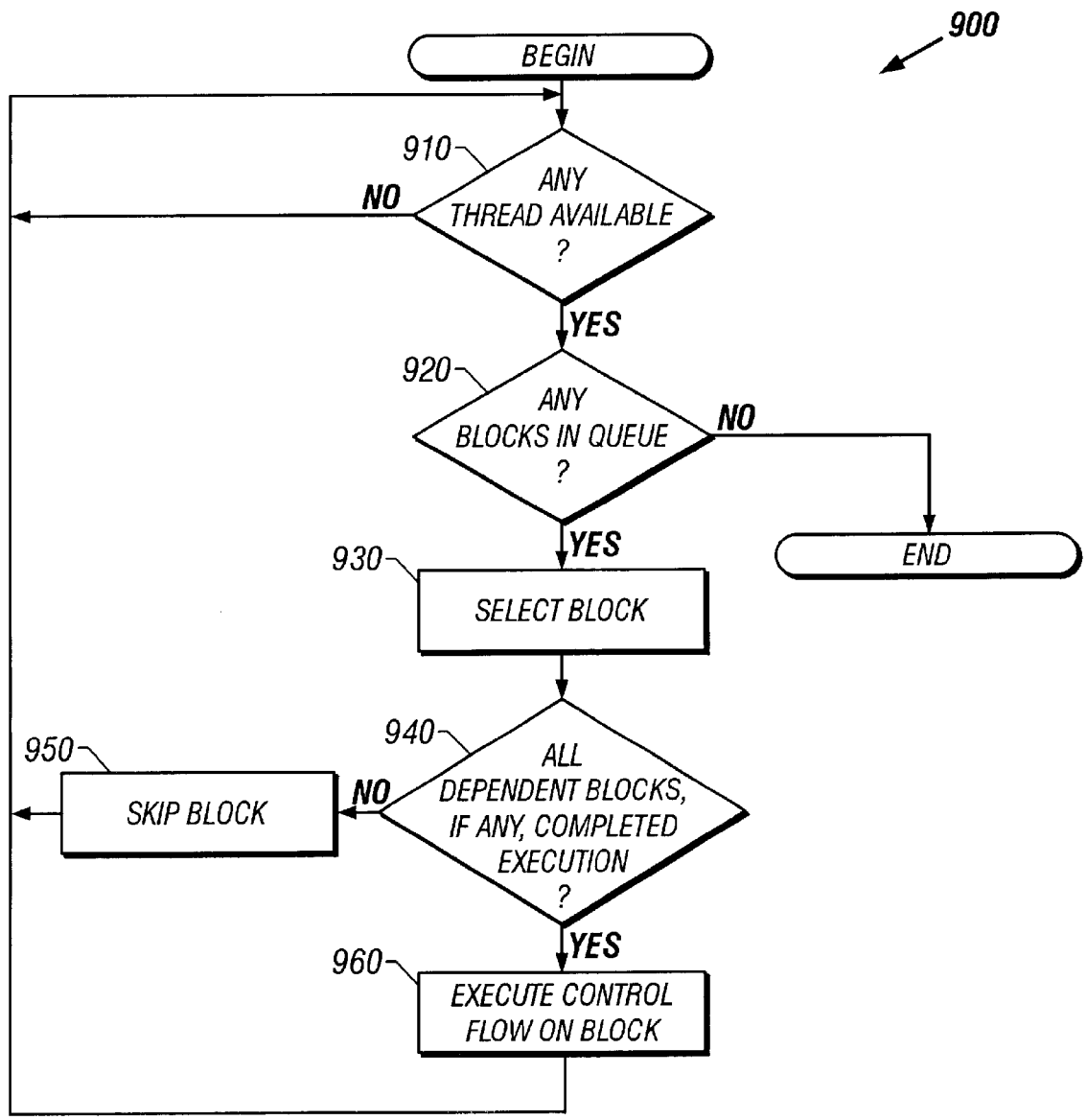
FIG. 9 depicts a flow chart of the operations performed during execution of a data flow program in accordance with the present invention.

The operation of a data flow program in accordance with the present invention will now be described with reference to process 900 of FIG. 9. Multiple threads are used to process the various components of a data flow program. Those skilled in the art will recognize that the number of threads is not important; the developer may specify any number, for example, one thread per processor, or the system may determine the number of threads based on the number of available processors and an analysis of the data flow program.

If a thread is available to process a block in accordance with its specified program code (step 910), the thread determines whether there are any blocks in the queue (step 920). If so, the available thread selects a block from the queue for processing (step 930). Typically, the blocks are selected from the queue based on the order in which they were placed in the queue. If, however, a thread determines that a selected block is dependent upon the execution of program code with respect to other block(s) that has/have not been executed (step 940), the thread skips the selected block (step 950). Otherwise, any block dependencies have been satisfied (step 940) and the thread uses an assigned processor to execute the program code associated with the block (step 960). Once the thread(s) processing a data flow program have dequeued all of the blocks in a queue awaiting processing (step 920), the process ends.

Figure 7:
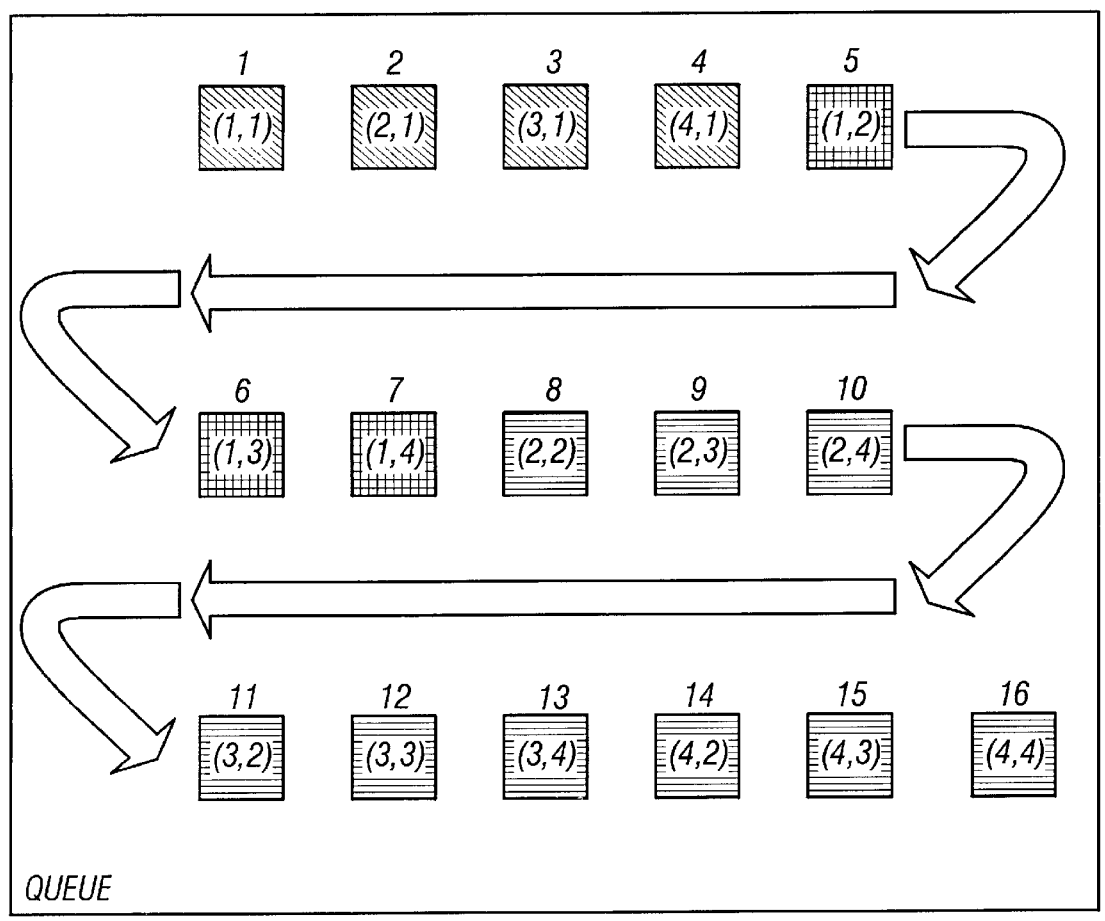
FIG. 7 depicts an example of a queue reflecting an order for execution of a data flow program in accordance with the present invention.
Figure 10A:
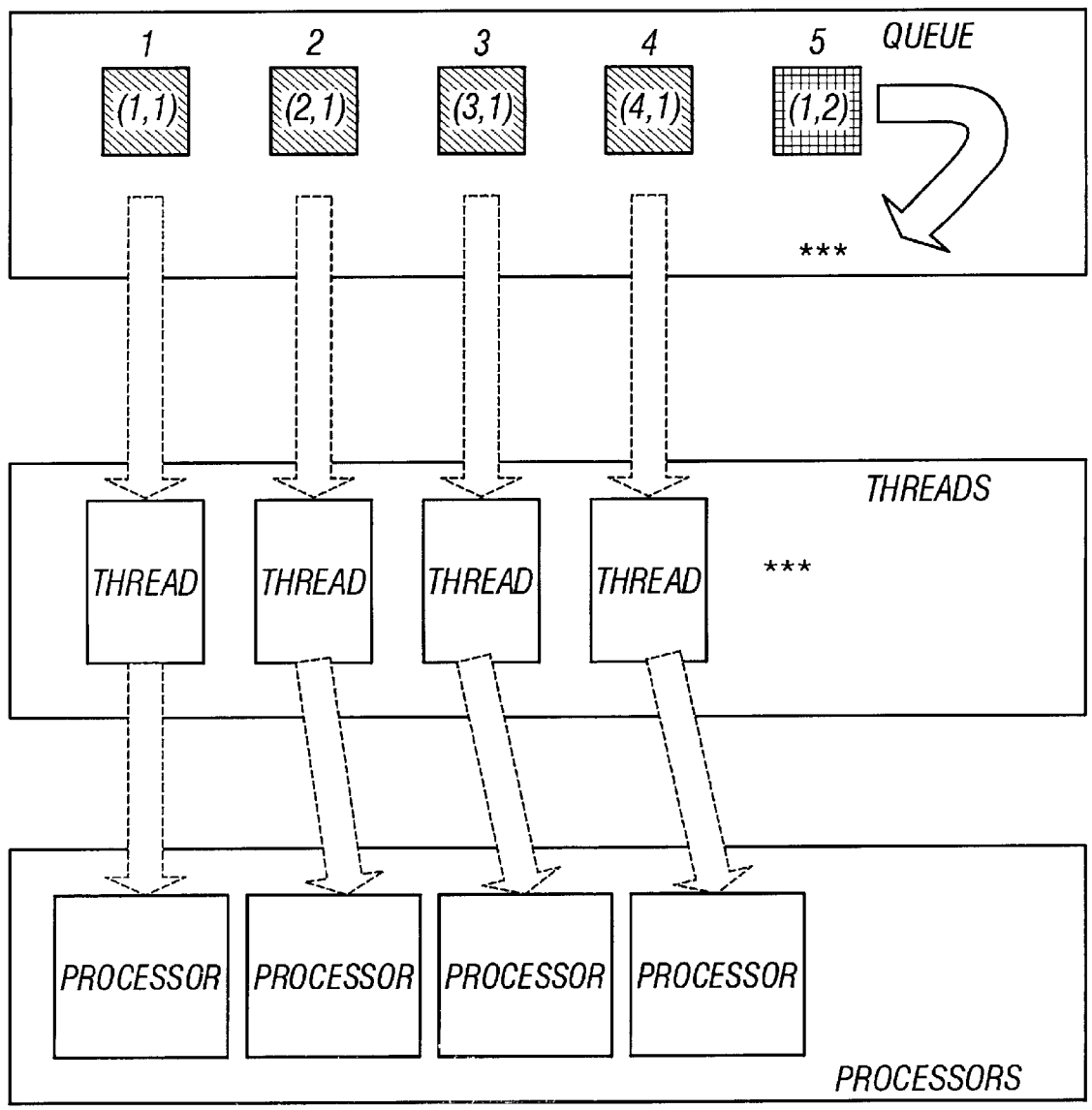
FIGS. 10A, 10B, and 10C depict block diagrams used to explain an execution cycle of a data flow program in accordance with the present invention.
Figure 10B:
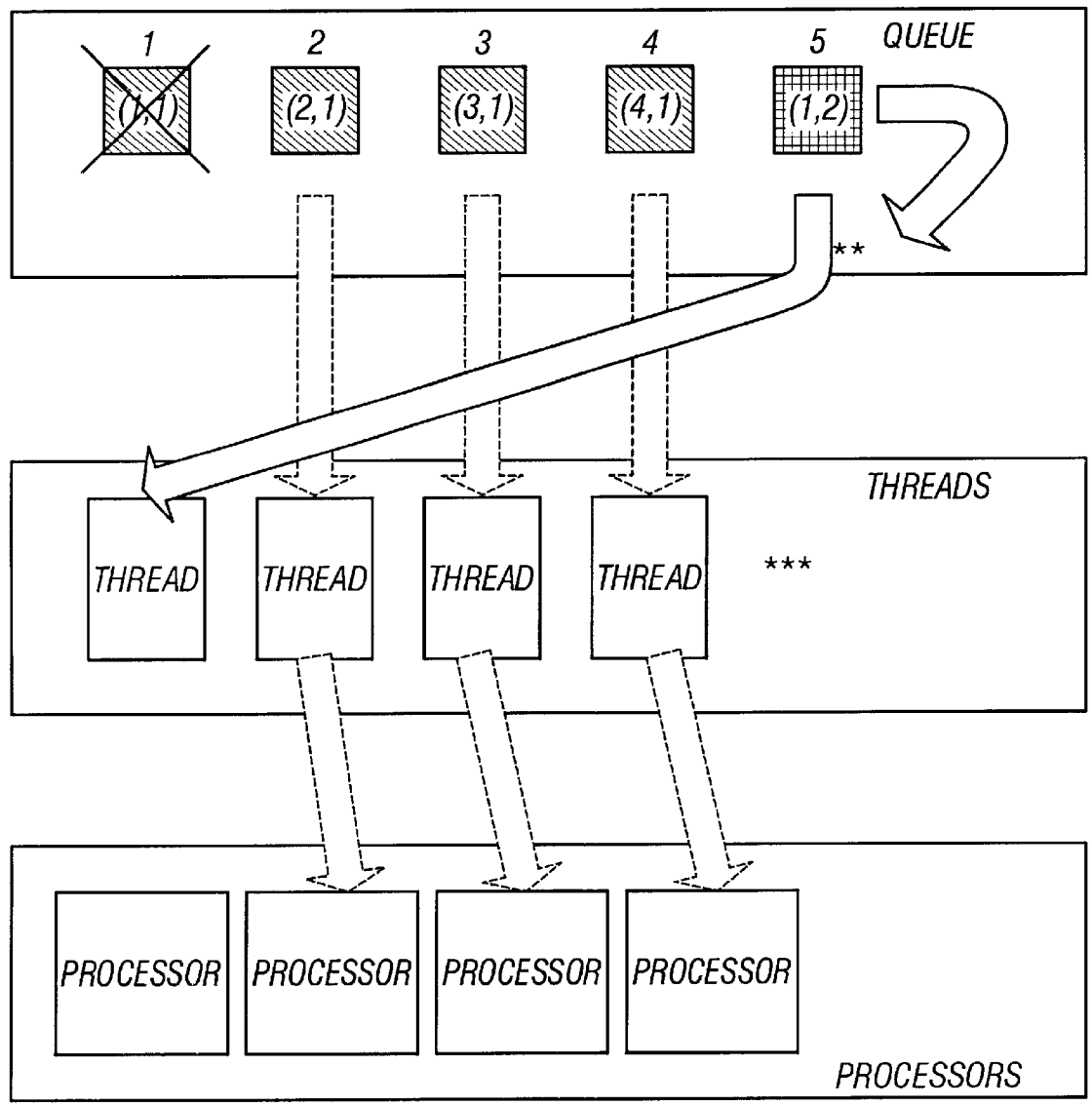
Figure 10C:
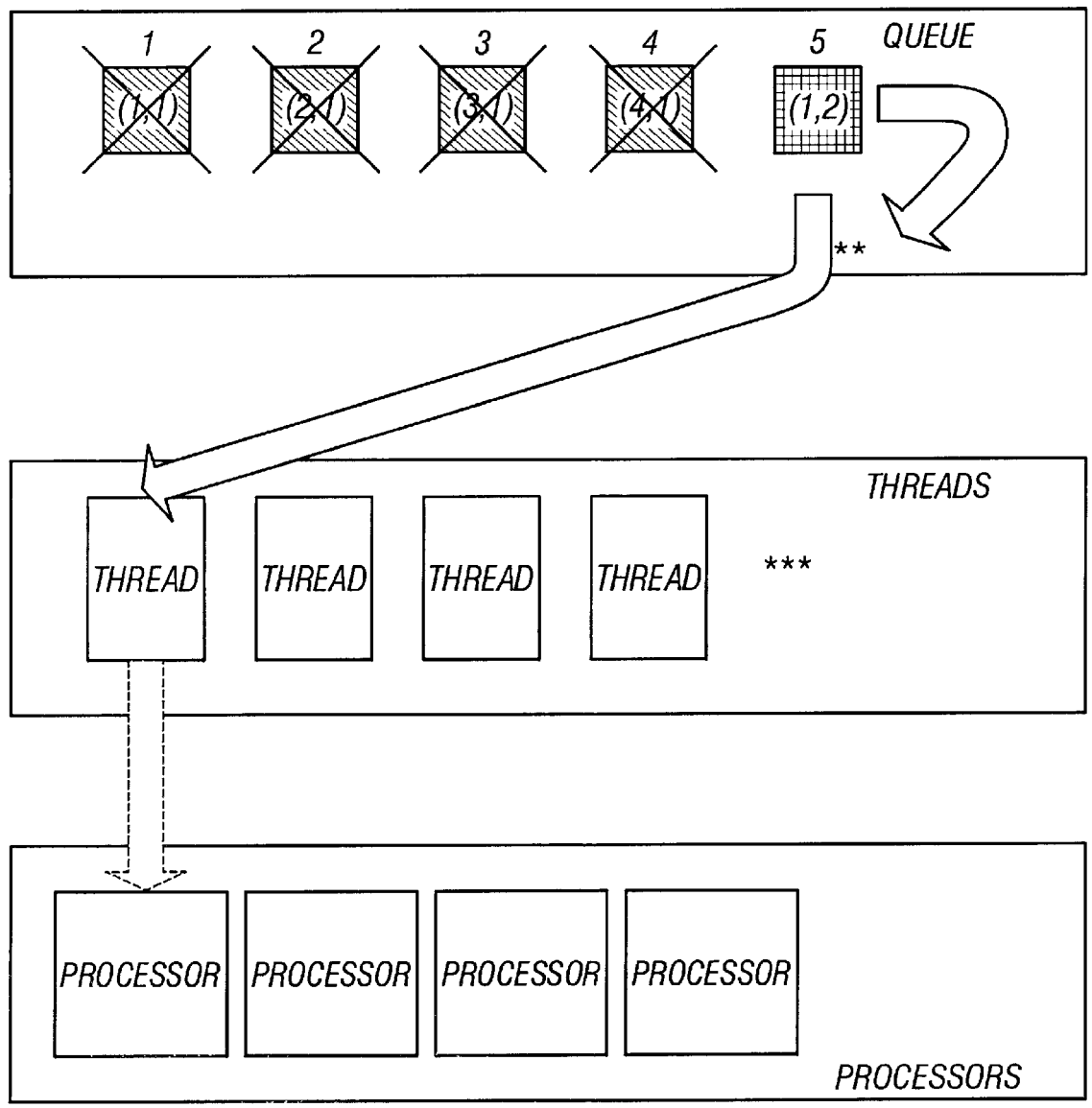

For purposes of illustrating the data flow program execution in accordance with process 900, FIGS. 10*a–c* illustrate a portion of the queue of FIG. 7, including the first five blocks of region 100 queued for processing. As shown in FIG. 10*a*, each thread processes a selected block using one of the processors. In this example, there are four threads and four processors. When a thread completes processing, as shown for example in FIG. 10*b* with one of the threads completing program execution of the block labeled (1,1), the thread attempts to execute the next available thread in the queue, in this case, the block labeled (1,2). However, the block labeled (1,2) is dependent upon the final state of other blocks still being executed, namely, blocks (2,1), (3,1), and (4,1). Once execution of the program code for all of these blocks has completed, as shown in FIG. 10*c*, a thread can continue processing with block (1,2). Those skilled in the art will recognize that, as opposed to remaining idle and, thus, not using computing resources efficiently, a thread may skip processing blocks in the queue and continue to process other queued blocks depending upon the dependency relationships associated with each block in the queue. Also, although FIG. 10 shows four threads and four processors, more or fewer threads or processors may be used depending upon the particular system configuration.

Optimizing Execution of Data Flow Programs

Once a DAG has been produced that represents the data dependencies for a given data flow program, the program may be executed in a multiprocessor computer system by traversing the DAG to order the nodes (i.e., blocks and corresponding program code) in the queue(s) for execution. For a given DAG there are multiple traversals that allow all the data dependencies for each node to be satisfied before that node is processed. Different traversals will result in different performance especially when the DAG is traversed in parallel with multiple threads of execution.

The principle factor in performance is the amount of time that a thread spends waiting. This occurs when there is no node in the graph that has its dependencies satisfied. A thread must therefore wait until processing of dependent blocks is complete before it can start processing. There are two strategies to improve performance: (1) Using a traversal that minimizes the wait time. (2) While a thread waits gather the resources needed to process a node.

Minimizing Wait Time

There are two main techniques used to produce a traversal. The first is to act directly upon the graph and reorder the nodes in a queue in the linear order that they will be processed. The second involves placing the nodes in priority queues.

Figure 11:
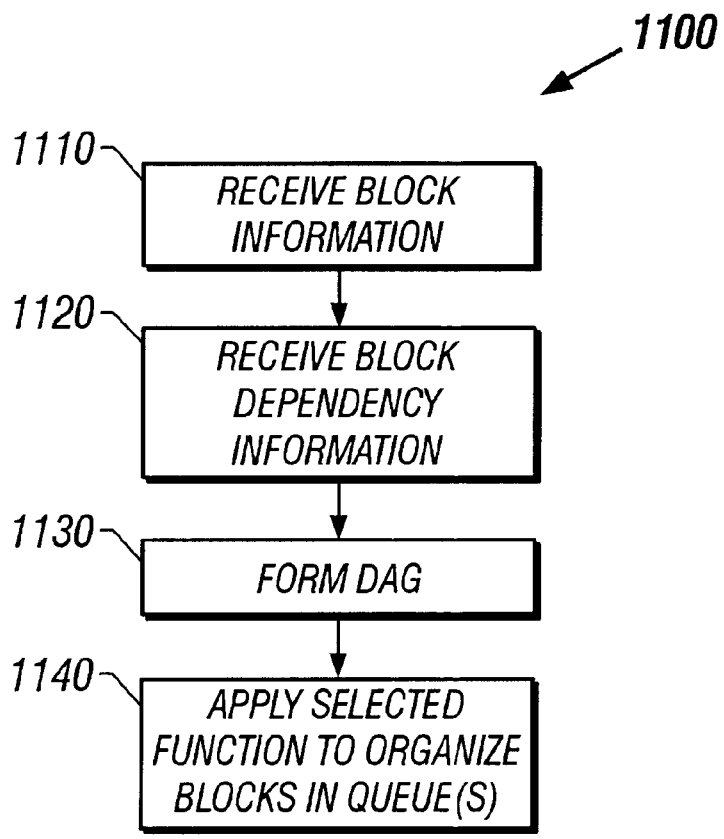
FIG. 11 depicts a flow chart of the operations performed to organize blocks in a queue to optimize performance of a data flow program in accordance with the present invention.

FIG. 11 is a flow chart of a process 1100 performed to organize blocks in queue(s) to optimize performance of a data flow program in accordance with the present invention. Process 1100 may be used for step 680 of process 600 to optimize performance of a data flow program developed using tool 522. Also, the performance of any data flow program with the requisite information may be optimized using process 1100. Process 1100 begins with steps for receiving the block information and any related dependency information for a data flow program (steps 1110 and 1120). A DAG is then generated reflecting the block and dependency information (step 1130). A selected function is then applied when traversing the DAG to optimize program execution by organizing the blocks in queue(s) according to the function (step 1140).

One function involves computing a weight for each node and sorting the nodes based upon the weights. The weights must be assigned such that no node has a data dependency on a node that has a lesser weight. A violation of this rule could lead to a deadlock during processing.

One weighting function involves assigning weights to nodes based on the maximum number of nodes that can be traversed from a given node to any other node in the DAG. For the example DAG shown in FIG. 12, a breadth-first traversal produces the following order:

A B C D E F G H

This is the order in which the nodes would be queued for processing. Assuming that each node takes exactly one time-step to process, two threads can traverse the DAG in six time steps as shown in the following table:

| Threads | Nodes Processed at Time | | | | | |
|---|---|---|---|---|---|---|
| 1 | A | B | D | F | G | H |
| 2 | | C | E | | | |

Using the weighting function where the maximum number of nodes that can be traversed from a given node to any other node in the DAG is assigned as the weight for each node, the following weights would be assigned to each node:

A-4
B-0
C-2
D-3
E-1
F-2
G-1
H-0

Figure 12:
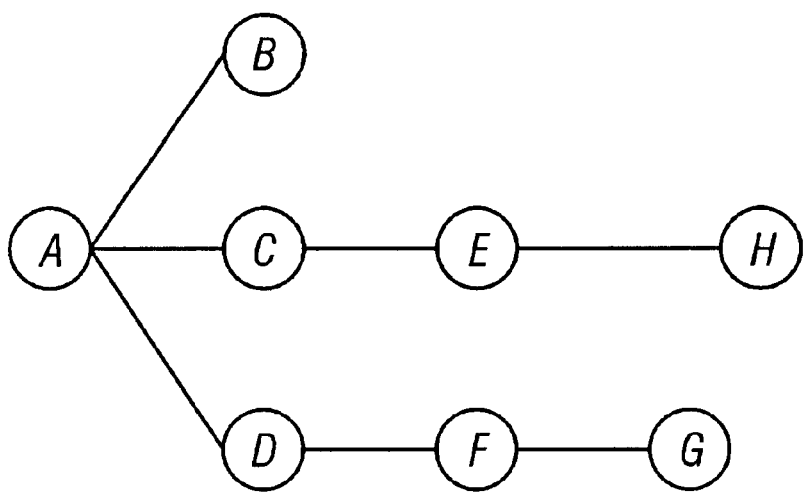
FIG. 12 depicts an example of a direct acyclic graph used to explain one of the methods for optimizing program performance in accordance with the present invention.

Consequently, sorting the nodes by weight would produce the following traversal, i.e., order in which corresponding blocks would be queued of FIG. 12:

A D C F E G B H

Two threads can execute code for the blocks queued according to this weighting function in five time steps as follows:

| Threads | Node Processed at Time | | | | |
|---|---|---|---|---|---|
| 1 | A | C | E | G | H |
| 2 | | D | F | B | |

Another weighting function involves assigning a time to each node that is an estimate of the time it takes to process the node. The function could be the maximum sum computed by adding up the times in each node along a traversal to another node in the DAG. Another modification is to assign a priority to each process (i.e., operation performed by the program code associated with each node). In the case where the weighting function produces a tie, the priority of the process associated with the node determines which node is processed first.

Figure 13:
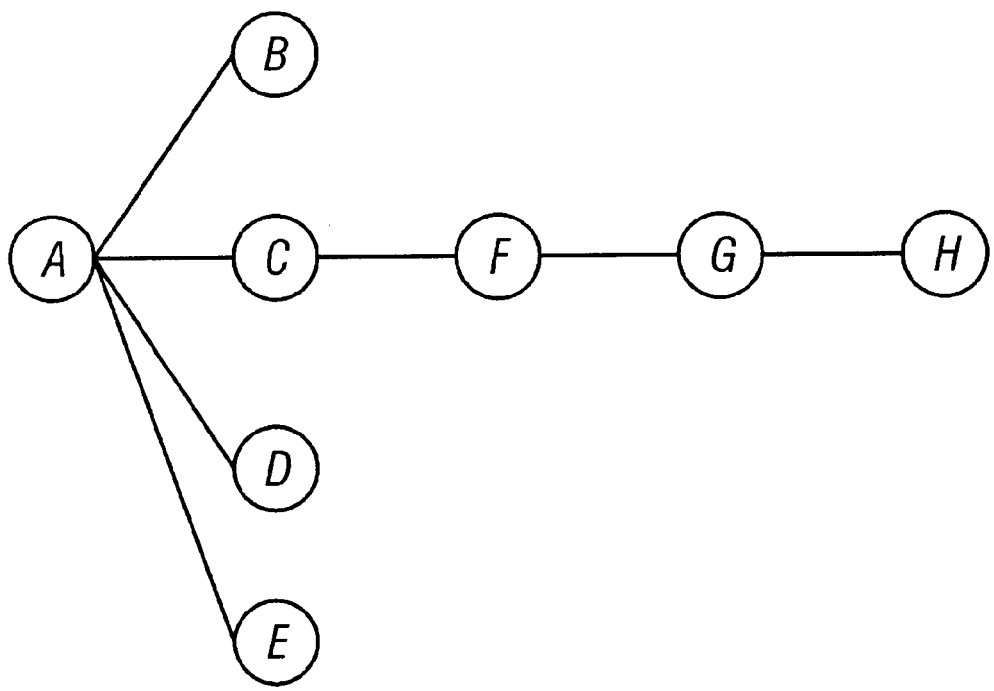
FIG. 13 depicts an example of a direct acyclic graph used to explain one of the methods for optimizing program performance in accordance with the present invention.

A sorting function may also be used to optimize program performance. Given a number, n, the sort can try to produce a DAG with a width of n. First, all the nodes with no unsatisfied dependencies are identified. Then the nodes with the largest weight are placed on the list. All data dependencies for the nodes on the list are considered satisfied and the algorithm is repeated until the entire DAG has been traversed. For example, using the DAG shown in FIG. 13, a simple sort would produce the following traversal:

A C F G B D E H

This traversal would take six time steps with two threads to complete:

| Threads | Nodes Processed at Time |   |   |   |   |   |
|---------|---|---|---|---|---|---|
| 1 | A | B | D |   | F | G | H |
| 2 |   | C | E |   |   |   |

However, a width-based sort with an n of 2 would produce the following traversal:

A C B F D G E H

This traversal can produce an order in which two threads can complete execution in five time steps as follows:

| Threads | Node Processed at Time |   |   |   |
|---------|---|---|---|---|---|
| 1 | A | B | D | E | H |
| 2 |   | C | F | G |   |

Accordingly, any ordering function that assigns a weight to a first node to be executed that is greater than a dependent node should produce a useful traversal and, thus, queue order for execution that optimizes the program's overall performance.

Another optimization function uses multiple queues, each with a different priority such that the threads select blocks out of the queues according to the queue priorities. Alternatively, a single queue may be used for this purpose and divided into different parts, each part having a different priority. To use this optimization approach, a priority must be assigned to each node in the graph. One method involves assigning high priorities to nodes that are associated with "bottlenecks", i.e., slow overall execution of a node's program code because, for example, it requires a significant amount of input and/or output operations.

Figure 14:
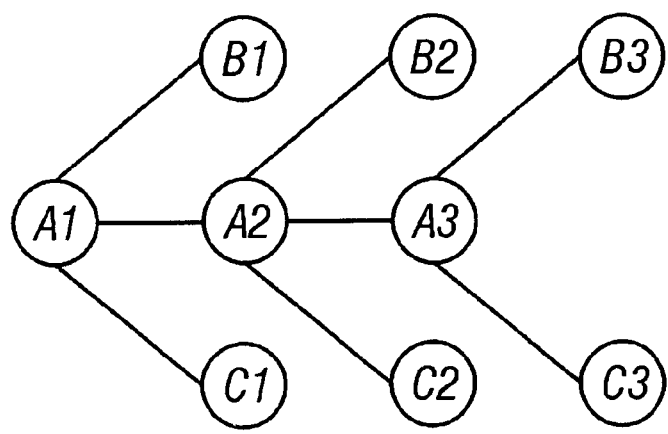
FIG. 14 depicts an example of a direct acyclic graph used to explain one of the methods for optimizing program performance in accordance with the present invention.

For example, the DAG illustrated in FIG. 14 has nodes associated with three processes A, B, and C. In this example, the process A nodes should be given a higher priority. Assuming that process A is given a priority of level of "2" and B and C are given a priority level of "1" then the nodes would be placed in two queues as follows:

queue 1: A1 A2 A3
queue 2: B1 C1 B2 C2 B3 C3

At the time of execution, each thread checks the first node in queue 2. If the node's dependencies have been satisfied, it is removed from the queue and processed. If not, the thread checks for a node in queue 1. If no nodes can be found it repeats the process until a node becomes available.

Assuming that each process takes one time step, two threads would execute the nodes as follows:

| Threads | Node Processed at Time |   |   |   |
|---------|---|---|---|---|---|
| 1 | A1 | A2 | A3 | B2 | B3 |
| 2 |   | B1 | C1 | C2 | C3 |

Using three threads, performance would be improved by one time step as follows:

| Threads | Node Processed at Time |   |   |   |
|---------|---|---|---|---|
| 1 | A1 | A2 | A3 | B3 |
| 2 |   | B1 | B2 | C3 |
| 3 |   | C1 | C2 |   |

Thus, the same DAG can produce different traversals depending on a number of factors, including the number of threads available for program execution. Two threads produces the following traversal: A1 A2 B1 A3 C1 B2 C2 B3 C3. Three threads produces the following traversal: A1 A2 B1 C1 A3 B2 C2 B3 C3.

Allocating Resources While Waiting

Although not all of the wait time associated with program execution can be eliminated, the spent waiting can be put to use by pre-fetching data that a thread will need during execution. First it identifies a node whose dependencies will likely be satisfied shortly and while it is waiting for the node to become available (i.e., its dependencies become fully satisfied) it pre-fetches the data it will need to process that node. When the dependencies are satisfied then processing can porceed at a higher rate, since some of the data is in cache.

Conclusion

Methods, systems, and articles of manufacture consistent with the present invention thus enable developer to easily develop data flow programs and to convert existing control flow programs according to the data flow model. By permitting developers to define memory regions and divide them into blocks with corresponding states (each related to particular control flow program instructions), the interface facilitates the development of a data flow program for execution in a multiprocessor environment. Although components of the program utilize the control flow programming method, the program as a whole is designed using a data flow approach. Additionally, each block contains a set of data, meaning that the program code associated with each block does not necessarily operate on scalars or single data items. This makes the present approach more useful for data-intensive programming systems that require significant data processing in which components can be easily processed in parallel on a multiprocessor computer system.

Also, methods consistent with the present invention are applicable to all programs for execution in a multiprocessor system regardless of the computer programming language. For example, Fortran 77 is a programming language commonly used to develop programs for execution by multiprocessor computer systems.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone. The invention may be implemented with both object-oriented and non-object-oriented programming systems. The scope of the invention is defined by the claims and their equivalents.

What is claimed is:

1. A computer-implemented method for at least one of reconfiguring the processing flow of an existing software program according to a data flow model, and developing a new software program according to said data flow model, said method comprising:

displaying a screen display; and permitting a user to:
- specify a memory region and divide said memory region into a plurality of blocks, each block of said plurality of blocks defining a set of values associated with a function;
- define sets of the blocks, each block in a set having a predetermined state reflected by a designated portion of said program according to said data flow model that when executed transforms the values defined by said block based on the function; and
- assign any dependencies among the blocks wherein each dependency indicates a relationship between a plurality of said blocks based on said predetermined state of each.

2. A data processing system containing a development tool that displays a user interface for at least one of reconfiguring the processing flow of an existing software program according to a data flow model, and developing a new software program according to said data flow model, said user interface comprising:
- a first view configured to receive instructions defining a memory region and dividing said memory region into a plurality of blocks, each block of said plurality of blocks defining a set of values associated with a function;
- a second view configured to receive instructions defining sets of the blocks, each block in a set having a predetermined state reflected by a designated portion of said program according to said data flow model that when executed transforms the values defined by said blocks based on the function; and
- a third view configured to receive information reflecting any dependencies among the blocks, wherein each dependency indicates a relationship between a plurality of said blocks based on said predetermined state of each block.

3. The graphical user interface of claim 2, wherein a dependency relationship between two blocks requires the portion of the program associated with one of the two blocks to be executed before the portion of the program associated with the other block.

4. A data processing system, comprising:
- a memory containing:
  - a first program;
  - a development tool for developing a second software program according to a data flow model, including (i) a memory region divided into region into a plurality of blocks, wherein each block in said plurality of blocks defines a set of values associated with a function and has a predetermined state reflected by a designated portion of the first program that when executed transforms the values defined by said block based on the functions, and (ii) any dependencies among the blocks, each wherein dependency indicates a relationship between two blocks and requiring the portion of the first program associated with a first block of the relationship to be executed before the portion of the first program associated with a second block of the relationship; and
- at least one processor for running the development tool.

5. The data processing system of claim 4, further comprising:
- a plurality of parallel processors for executing the second program in accordance with the stored dependencies.

6. A data processing system for at least one of reconfiguring the processing flow of an existing software program according to a data flow model, and developing a new software program according to said data flow model, said system comprising:
- a memory having instructions; and
- a processor responsive to the instructions and configured to permit a user to (i) specify a memory region and divide said memory region into a plurality of blocks, each block in said plurality of blocks defining a set of values associated with a function, (ii) define sets of the blocks, each block in a set having a predetermined state reflected by a designated portion of said program that when executed transforms the values defined by said block based on the function, and (iii) assign any dependencies among the blocks wherein each dependency indicates a relationship between a plurality of said blocks based on said predetermined state of each block.

7. A computer-readable medium containing instructions for controlling a data processing system to perform a method for at least one of reconfiguring a processing flow of an existing software program according to a data flow model, and developing a new software program according to said data flow model, said method comprising:
- permitting a user to specify a memory region and divide said memory region into a plurality of blocks, each block of said plurality of blocks defining a set of values associated with a function;
- permitting a user to define sets of the blocks, each block in a set having a predetermined state reflected by a designated portion of said program according to said data flow model that when executed transforms the values defined by said block based on the function; and
- permitting a user to assign any dependencies among the blocks wherein each dependency indicates a relationship between a plurality of said blocks based on said predetermined state of each block.

8. A computer-readable medium containing instructions for controlling a data processing system to perform a method for at least one of reconfiguring a processing flow of an existing software program according to a data flow model, and developing a new software program according to said data flow model, said method comprising:
- displaying a first view configured to receive instructions defining a memory region and dividing said memory region into a plurality of blocks, each block of said plurality of blocks defining a set of values associated with a function;
- displaying a second view configured to receive instructions defining sets of the blocks, each block in a set having a predetermined state reflected by a designated portion of said program according to said data flow model that when executed transforms the values defined by said blocks based on the function; and
- displaying a third view configured to receive information reflecting any dependencies among the blocks, wherein each dependency indicates a relationship between a plurality of said blocks based on said predetermined state of each block.

9. The computer-readable medium of claim 8, wherein a dependency relationship between two blocks requires the portion of the program associated with one of the two blocks to be executed before the portion of the program associated with the other block.

10. A method for optimizing execution of a software program according to a data flow model in a multiprocessor computer system, the method comprising:

receiving memory region information, including block information reflecting a plurality of blocks that define a memory region, wherein each block defines a set of values associated with a function and has a predetermined state reflected by a designated portion of said program according to said data flow model that when executed transforms the values defined by said block based on the function, and dependency information reflecting any dependencies among the blocks, wherein each dependency indicates a relationship between two blocks and requiring the portion of the program associated with a first block of the relationship to be executed before the portion of the program associated with a second block of the relationship; and forming a queue organizing the memory region information.

11. The method of claim 10, further comprising:

executing the designated portion of the program associated with each block in accordance with the organization of the memory region information in the queue.

12. The method of claim 11, wherein the queue has at least two parts, each part having a priority, and wherein executing the designated portion of the program associated with each block in accordance with the organization of the memory region information in the queue, includes:

using a priority assigned to each block to place the blocks in the two parts of the queue.

13. The method of claim 12, wherein executing the designated portion of the program associated with each block in accordance with the organization of the memory region information in the queue, further includes:

selecting blocks from the two parts of the queues based on the priority of each part of the queue with the blocks in a part of the queue having a high priority given preference over blocks in a part of the queue having a low priority.

14. The method of claim 13, wherein selecting blocks from the two parts of the queues based on the priority of each part of the queue with the blocks in a part of the queue having a high priority given preference over blocks in a part of the queue having a low priority, includes:

selecting a block from the high priority part of the queue; and determining whether all dependency relationships, if any, associated with the selected block from the high priority part of the queue have been satisfied, and initiating execution of the program code associated with that block when it is determined that all dependency relationships, if any, associated with that block have been satisfied.

15. The method of claim 14, wherein selecting blocks from the two parts of the queues based on the priority of each part of the queue with the blocks in a part of the queue having a high priority given preference over blocks in a part of the queue having a low priority, includes:

selecting a block from the low priority part of the queue when it is determined that all dependency relationships, if any, associated with the block selected from the high priority part of the queue have not been satisfied, and initiating execution of the program code associated with the selected block from the low priority part of the queue when it is determined that all dependency relationships, if any, associated with the selected block from the low priority part of the queue have been satisfied.

16. The method of claim 11, wherein executing the designated portion of the program associated with each block in accordance with the organization of the memory region information in the queue, includes:

using a priority assigned to each block to place the blocks in at least two queues, each queue having a different priority.

17. The method of claim 16, wherein executing the designated portion of the program associated with each block in accordance with the organization of the queue, further includes:

selecting blocks from the queues based on the priority of each queue with the blocks in the queue having a high priority given preference over blocks in the queue having a low priority.

18. The method of claim 11, wherein executing the designated portion of the program associated with each block in accordance with the organization of the memory region information in the queue, includes:

pre-fetching available data require for execution of a block when resources to execute the block are available and all of the block's dependency relationships have not been satisfied.

19. The method of claim 10, wherein forming a queue organizing the memory region information includes:

generating a directed acyclic graph based on the memory region information with each block having a corresponding node in the graph;

traversing the directed acyclic graph according to a predetermined function; and placing information identifying each block in the queue based on the traversal of the directed acyclic graph.

20. The method of claim 19, wherein traversing the directed acyclic graph according to a predetermined function includes:

applying weights associated with each block such that no block has a data dependency on a block that has a lesser weight.

21. A system for optimizing a software program based on a data flow model for execution in a multiprocessor computer system, said system comprising:

a memory having a program characterized by memory region information, including block information reflecting a plurality of blocks that define a memory region, wherein each block defines a set of values associated with a function and has a predetermined state reflected by a designated portion of said program according to said data flow model that when executed transforms the values defined by said block based on the function, and dependency information reflecting any dependencies among the blocks, wherein each dependency indicates a relationship between two blocks and requiring the portion of the program associated with a first block of the relationship to be executed before the portion of the program associated with a second block of the relationship; and at least one processor configured to form a queue organizing the memory region information.

22. The system of claim 21, wherein the multiprocessor computer system executes the designated portion of the program associated with each block in accordance with the organization of the memory region information in the queue.

23. The system of claim 22, wherein the queue has at least two parts, each part having a priority, and wherein when the processor executes the designated portion of the program associated with each block in accordance with the organization of the memory region information in the queue, the processor uses a priority assigned to each block to place the blocks in the two parts of the queue.

24. The system of claim 23, wherein when the processor executes the designated portion of the program associated with each block in accordance with the organization of the memory region information in the queue, the processor selects blocks from the two parts of the queues based on the priority of each part of the queue with the blocks in a part of the queue having a high priority given preference over blocks in a part of the queue having a low priority.

25. The system of claim 24, wherein when the processor selects blocks from the two parts of the queues based on the priority of each part of the queue with the blocks in a part of the queue having a high priority given preference over blocks in a part of the queue having a low priority, the processor selects a block from the high priority part of the queue, and determines whether all dependency relationships, if any, associated with the selected block from the high priority part of the queue have been satisfied, and initiating execution of the program code associated with that block when it is determined that all dependency relationships, if any, associated with that block have been satisfied.

26. The system of claim 25, wherein when the processor selects blocks from the two parts of the queues based on the priority of each part of the queue with the blocks in a part of the queue having a high priority given preference over blocks in a part of the queue having a low priority, the processor selects a block from the low priority part of the queue when it is determined that all dependency relationships, if any, associated with the block selected from the high priority part of the queue have not been satisfied, and initiating execution of the program code associated with the selected block from the low priority part of the queue when it is determined that all dependency relationships, if any, associated with the selected block from the low priority part of the queue have been satisfied.

27. The system of claim 22, wherein when the processor executes the designated portion of the program associated with each block in accordance with the organization of the memory region information in the queue, the processor uses a priority assigned to each block to place the blocks in at least two queues, each queue having a different priority.

28. The system of claim 27, wherein when the processor executes the designated portion of the program associated with each block in accordance with the organization of the memory region information in the queue, the processor selects blocks from the queues based on the priority of each queue with the blocks in the queue having a high priority given preference over blocks in the queue having a low priority.

29. The system of claim 22, wherein when the processor executes the designated portion of the program associated with each block in accordance with the organization of the memory region information in the queue, the processor pre-fetches available data require for execution of a block when resources to execute the block are available and all of the block's dependency relationships have not been satisfied.

30. The system of claim 21, wherein when the processor forms a queue organizing the memory region information, the processor (i) generates a directed acyclic graph based on the memory region information with each block having a corresponding node in the graph, (ii) traverses the directed acyclic graph according to a predetermined function, and (iii) places information identifying each block in the queue based on the traversal of the directed acyclic graph.

31. The system of claim 30, wherein when the processor traverses the directed acyclic graph according to a predetermined function, the processor applies weights associated with each block such that no block has a data dependency on a block that has a lesser weight.

32. A computer-readable medium containing instructions for performing a method for optimizing execution of a software program according to a data flow model in a multiprocessor computer system, the method comprising:

receiving memory region information, including block information reflecting a plurality of blocks that define a memory region, wherein each block defines a set of values associated with a function and has a predetermined state reflected by a designated portion of said program according to said data flow model that when executed transforms the values defined by said block based on the function, and dependency information reflecting any dependencies among the blocks, wherein each dependency indicates a relationship between two blocks and requiring the portion of the program associated with a first block of the relationship to be executed before the portion of the program associated with a second block of the relationship; and forming a queue organizing the memory region information.

33. The computer-readable medium of claim 32, wherein the method further comprises:

executing the designated portion of the program associated with each block in accordance with the organization of the memory region information in the queue.

34. The computer-readable medium of claim 33, wherein traversing the directed acyclic graph according to a predetermined function includes:

applying weights associated with each block such that no block has a data dependency on a block that has a lesser weight.

35. The computer-readable medium of claim 34, wherein executing the designated portion of the program associated with each block in accordance with the organization of the memory region information in the queue, further includes:

selecting blocks from the two parts of the queues based on the priority of each part of the queue with the blocks in a part of the queue having a high priority given preference over blocks in a part of the queue having a low priority.

36. The computer-readable medium of claim 35, wherein selecting blocks from the two parts of the queues based on the priority of each part of the queue with the blocks in a part of the queue having a high priority given preference over blocks in a part of the queue having a low priority, includes:

selecting a block from the high priority part of the queue; and determining whether all dependency relationships, if any, associated with the selected block from the high priority part of the queue have been satisfied, and initiating execution of the program code associated with that block when it is determined that all dependency relationships, if any, associated with that block have been satisfied.

37. The computer-readable medium of claim 33, wherein the queue has at least two parts, each part having a priority, and wherein executing the designated portion of the program associated with each block in accordance with the organization of the queue, includes:

using a priority assigned to each block to place the blocks in the two parts of the queue.

38. The computer-readable medium of claim 35, wherein selecting blocks from the two parts of the queues based on the priority of each part of the queue with the blocks in a part of the queue having a high priority given preference over blocks in a part of the queue having a low priority, includes:

selecting a block from the low priority part of the queue when it is determined that all dependency relationships, if any, associated with the block selected from the high priority part of the queue have not been satisfied, and initiating execution of the program code associated with the selected block from the low priority part of the queue when it is determined that all dependency relationships, if any, associated with the selected block from the low priority part of the queue have been satisfied.

39. The computer-readable medium of claim 38, wherein executing the designated portion of the program associated with each block in accordance with the organization of the memory region information in the queue, further includes:

selecting blocks from the queues based on the priority of each queue with the blocks in the queue having a high priority given preference over blocks in the queue having a low priority.

40. The computer-readable medium of claim 33, wherein executing the designated portion of the program associated with each block in accordance with the organization of the memory region information in the queue, includes:

using a priority assigned to each block to place the blocks in at least two queues, each queue having a different priority.

41. The computer-readable medium of claim 33, wherein executing the designated portion of the program associated with each block in accordance with the organization of the memory region information in the queue, includes:

pre-fetching available data require for execution of a block when resources to execute the block are available and all of the block's dependency relationships have not been satisfied.

42. The computer-readable medium of claim 32, wherein forming a queue organizing the memory region information includes:

generating a directed acyclic graph based on the memory region information with each block having a corresponding node in the graph;

traversing the directed acyclic graph according to a predetermined function; and placing information identifying each block in the queue based on the traversal of the directed acyclic graph.

\* \* \* \* \*